Jan. 17, 1933. J. M. WESTERBERG 1,894,332
SANITARY MILK PAIL
Filed Oct. 14, 1930
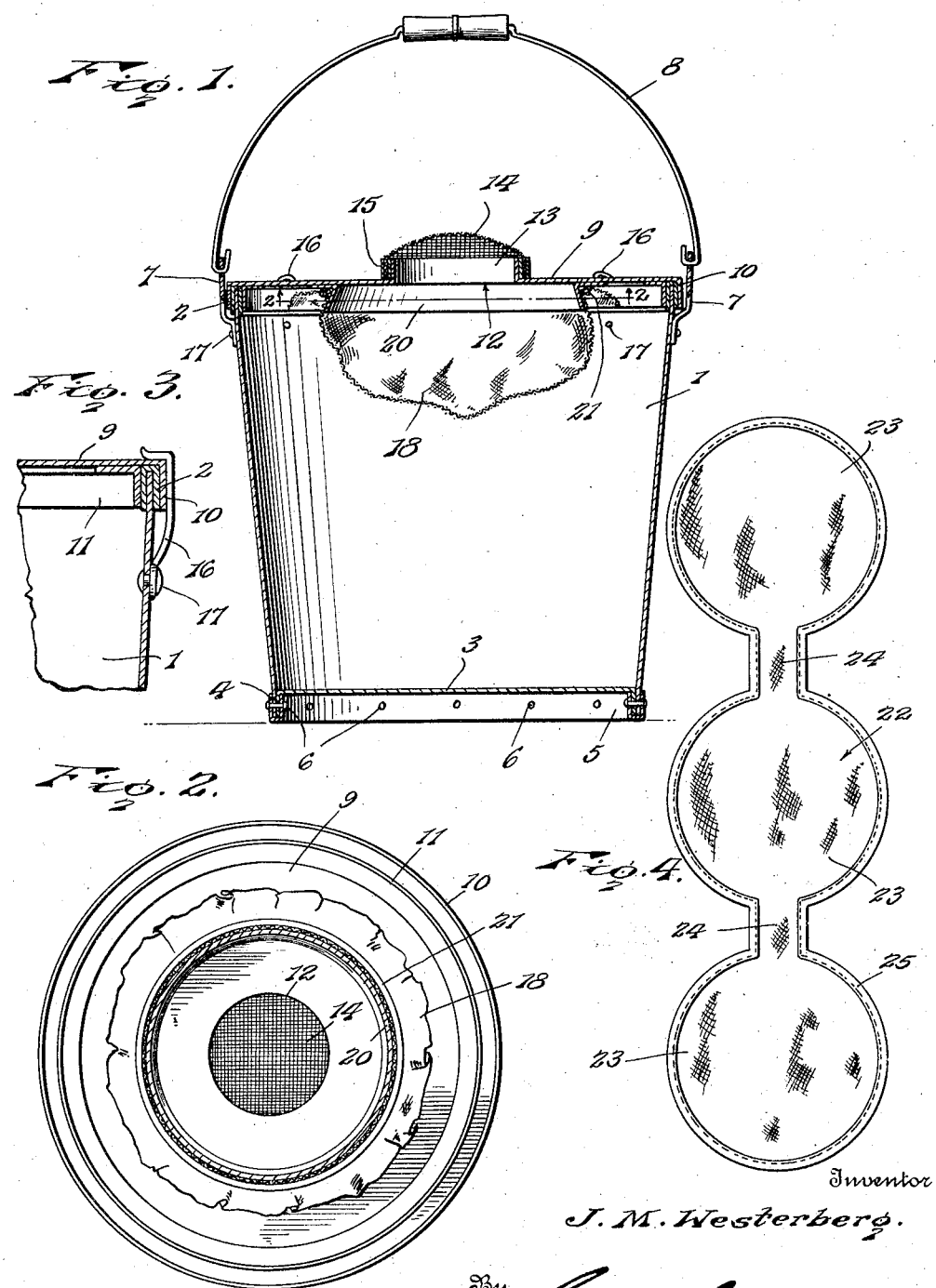
Inventor
J. M. Westerberg.
By Lacey & Lacey, Attorneys Patented Jan. 17, 1933

1,894,332

UNITED STATES PATENT OFFICE

JENNIE M. WESTERBERG, OF BORING, OREGON

SANITARY MILK PAIL

Application filed October 14, 1930. Serial No. 488,629.

This invention relates to milk pails and one object of the invention is to provide a milk pail having an improved cover including a strainer through which milk may enter the pail and dirt be excluded, thus protecting the milk from pollution and to further provide a cover that will aid in cooling the milk.

Another object of the invention is to so form the cover that, when a strainer cloth is applied thereto, the cloth will be very firmly held in place and prevented from slipping loose but may be very easily removed after the milk has been strained.

Another object of the invention is to provide the pail with a cover of such construction that after the milking has been finished and the straining cloth removed the strainer cap may again be applied to the opening in the cover through which the milk enters in order to exclude insects while, at the same time, permitting warm air to escape from the pail.

Another object of the invention is to so form the pail that its upper and lower portions will be strongly reinforced and to further so form the pail and its cover that, when the cover is applied, a tight joint will be established between the pail and the cover.

Another object of the invention is to so form the lower portion of the pail that its bottom will be retained in an elevated position and air permitted to circulate beneath the bottom of the pail and thereby assist in cooling the milk.

The invention is illustrated in the accompanying drawing, wherein

Figure 1 is a vertical sectional view through the improved pail,

Fig. 2 is a sectional view on the line 2—2 of Fig. 1,

Fig. 3 is an enlarged fragmentary sectional view showing the manner in which the cover fits upon the pail and is secured thereon, and Fig. 4 is a view of a straining cloth which, when applied to the cover, provides three thicknesses of cloth for the milk to pass through.

The improved milk pail has a body 1 which tapers toward its lower end for practically its entire depth and has the upper marginal portions of its walls straddled by a binding strip 2 which is also formed of metal. This binding strip is folded longitudinally in order that it may straddle the upper marginal portions of the walls and when it is soldered into place it provides the walls of the pail with a smooth upper edge and eliminates a bead. Therefore, dirt cannot easily collect about the upper margins of the walls of the pail. The binding strip and the marginal portions of the walls straddled thereby extend vertically for the full depth of the binding strip but from the lower edge of said strip, the pail tapers slightly to its lower end, as previously stated. The bottom 3 fits into the lower portion of the body and has its marginal portion bent downwardly to form a circumferentially extending depending flange 4 which has close fitting engagement with the walls of the pail. A binding strip 5 similar to the binding strip 2 straddles the flange 4 and lower marginal portions of the walls and when soldered into place firmly secures the bottom and reinforces the lower portion of the pail, as well as providing it with a smooth and rounded lower edge. By referring to Figure 1 of the drawing, it will be seen that the bottom when so secured will be spaced above the lower end of the pail and since the binding and the flange 4 and walls of the pail have openings 6 formed therethrough, air may circulate beneath the pail when the pail is set upon a table or floor. Free circulation of air beneath the pail will greatly assist in cooling the milk in the pail.

Ears 7 are riveted or otherwise firmly secured to walls of the pail in opposed relation to each other and these ears, which project upwardly, carry a handle 8 which may be disposed in a raised position or swung downwardly at one side of the pail.

In order to close the open upper end of the pail, there has been provided a cover 9 which is also preferably formed of metal and has its marginal portion bent to form a depending flange 10 which fits snugly about the reinforcement or strip 2 when the cover is applied to the pail. Inwardly of the flange or rim 10 is disposed an inner rim 11, also formed of metal, and this inner rim is so spaced from the outer rim that when the cover is applied, the binding strip 2 will fit snugly between the two rims, as shown in Figures 1 and 3, and form a tight closure between the cover and the walls of the pail. At its center, the cover is formed with a filling opening 12 having an upstanding neck 13 about its margin and in order to prevent insects and dirt from passing inwardly through this neck there has been provided a cap 14 formed of foraminous material such as wire mesh. The margins of the sheet of wire mesh from which the cap is formed are bound, as shown at 15, by inner and outer rings or by a strip of metal folded to form a binding U-shaped in cross section similar to the binding strip 2 and 5. This binding strip or collar 15 is of such diameter that it fits snugly about the neck 13. Therefore, the cap may be easily applied or removed but will not be liable to slip out of position. Resilient clips 16, which are preferably four in number, are secured against walls of the pail by rivets or equivalent fasteners 17 and since these clips are resilient they may be sprung out of position to engage the cover when applying or removing the cover and, if necessary, turned about their fasteners to a lowered position where they will be out of the way. The bills of these clips overlap the cover, as shown in Figure 3, and securely hold the cover in place upon the pail.

When milk is poured into the pail through the neck and filling opening, it is desired to have the milk strained to remove any dirt. In order to do so, there has been provided a strainer 18 formed of closely woven fabric. This strainer cloth is of sufficient size to be engaged about an inclined collar 20 carried by the cover in encircling relation to the opening 12 with portions of the sheet of fabric extending downwardly in a bag-like formation, as shown in Figure 1, and in order to secure the strainer about the collar, there has been provided an elastic band 21 of proper dimensions to bind the strainer firmly about the collar. It should be noted that the collar flares downwardly from the cover, thereby preventing danger of the elastic band sliding downwardly and out of encircling relation to the collar. Therefore, the strainer cannot accidentally slip out of place and drop downwardly into the pail.

Instead of having the strainer consist of a single thickness of fabric, as shown in Figure 1, it may be formed from a blank, shown in Figure 4 and indicated in general by the numeral 22. This blank consists of substantially circular sections 23 connected by reduced neck portions 24 and its margins are overlapped, as shown at 25, by a strip of folded fabric in order to prevent raveling. When this form of strainer is in use, it is folded to dispose the circular sections one against the other and when in the folded position is applied to the cover and secured about the collar by the elastic band, as previously set forth. It will be understood that, while the blank has been shown formed with three circular sections, any number desired may be provided.

When this milk pail is in use, the cover is applied with the strainer attached thereto and the cap fitted upon the neck. As the milk passes through the wire mesh and fabric strainer, all dirt and foreign matter will be removed therefrom. Therefore, the milk is kept clean from the very beginnig and flies and other insects will also be prevented from passing inwardly through the neck. After the milking has been finished, the pail may be lifted by its handle and easily carried to a spring house or other cooling chamber where it will be set upon a shelf or floor. The fact that openings 6 have been formed below the bottom permits air to circulate beneath the bottom of the pail and assists cooling and since the filling opening is covered by a foraminous cap, warm air may pass out of the pail. Therefore, the milk can easily and quickly cool.

What is claimed is:

A milk pail comprising a receptacle having a bottom and open at its top, a reinforcing strip covering the upper edge of the receptacle, a cover for the receptacle having spaced inner and outer rims adapted to bear against said reinforcing strip, an annular collar of substantially the same height as the inner and outer rims secured to the lower face of the cover and inclined outwardly and downwardly, there being an opening formed in the cover at the center of the collar and of less diameter than the collar, a neck projecting upwardly from the collar at said opening, a concavo-convex screen fitted to the neck with its convex face presented upwardly, a sheet of fabric having its marginal edge portion fitting around the collar, said sheet of fabric being considerably larger than the concavo-convex screen and having its intermediate portion immediately below the screen bowed downwardly, and a flexible securing element disposed in the angle formed at the junction of the collar and lower face of the cover and bearing against the fabric strip for detachably securing said fabric strip in position on the collar.

In testimony whereof I affix my signature.

JENNIE M. WESTERBERG.